(12) United States Patent
Kux et al.

(10) Patent No.: US 7,017,821 B2
(45) Date of Patent: Mar. 28, 2006

(54) INDIVIDUAL CONFIGURATION

(75) Inventors: Andreas Kux, Haar (DE); Herbert Palm, Höhenkirchen (DE)

(73) Assignee: Infineon Technologies AG, Munich (DE)

( * ) Notice: Subject to any disclaimer, the term of this patent is extended or adjusted under 35 U.S.C. 154(b) by 361 days.

(21) Appl. No.: 10/253,176

(22) Filed: Sep. 24, 2002

(65) Prior Publication Data

US 2003/0065473 A1 Apr. 3, 2003

Related U.S. Application Data

(63) Continuation of application No. PCT/DE01/00695, filed on Feb. 22, 2001.

(30) Foreign Application Priority Data

Mar. 24, 2000 (EP) .................................. 00106475

(51) Int. Cl.
  *G06K 19/067* (2006.01)
  *G06K 19/073* (2006.01)
  *H01L 23/58* (2006.01)

(52) U.S. Cl. ...................... 235/487; 235/488; 235/492; 235/494; 257/48

(58) Field of Classification Search .................. 438/14, 438/17, 18; 235/487, 488, 492, 494; 257/48
See application file for complete search history.

(56) References Cited

U.S. PATENT DOCUMENTS

| | | | | |
|---|---|---|---|---|
| 4,943,537 A * | 7/1990 | Harrington, III | ............ | 438/217 |
| 5,302,854 A * | 4/1994 | Nishiguchi et al. | ......... | 257/737 |
| 5,827,629 A * | 10/1998 | Miyatake | ...................... | 430/30 |
| 5,898,228 A * | 4/1999 | Sugasawara | ................. | 257/797 |
| 5,916,715 A * | 6/1999 | Fulford et al. | ................. | 430/22 |
| 6,305,095 B1* | 10/2001 | Look et al. | .................... | 33/645 |
| 6,467,691 B1* | 10/2002 | Green | ......................... | 235/487 |
| 6,559,531 B1* | 5/2003 | Sutherland | .................. | 257/686 |
| 6,593,168 B1* | 7/2003 | Ehrichs et al. | .............. | 438/108 |
| 6,812,046 B1* | 11/2004 | Drost et al. | ................... | 438/14 |

FOREIGN PATENT DOCUMENTS

| | | |
|---|---|---|
| DE | 197 14 519 A1 | 8/1998 |
| JP | 11 328 502 | 11/1999 |
| WO | WO 86/02047 | 4/1986 |
| WO | WO 99/62027 | 12/1999 |

OTHER PUBLICATIONS

S. Srivastava et al., "A novel electrical test structure for measuring misalignment between polysilicon and active area in MOS VLSI technologies", Jan. 1991, VLSI Design, pp. 290-292.*

(Continued)

*Primary Examiner*—Evan Pert
(74) *Attorney, Agent, or Firm*—Laurence A. Greenberg; Werner H. Stemer; Ralph E. Locher

(57) ABSTRACT

An individual configuration contains at least a first structure and a second structure, which are aligned with respect to each other. A position sensing device that senses a relative position of the first structure with respect to the second structure, in order to establish that a manipulation has been performed on the configuration, is provided.

8 Claims, 2 Drawing Sheets

OTHER PUBLICATIONS

L.M. Vitomirov et al., "Lateral Power MOSFET Low-Doped Drain (LDD) Misalignment Test Structure", Mar. 1997, Proc. IEEE 1997 Int. Conference on Microelectronic Test Structures, vol. 10, pp. 31-34.*

* cited by examiner

INDIVIDUAL CONFIGURATION

CROSS-REFERENCE TO RELATED APPLICATION

This application is a continuation of copending International Application No. PCT/DE01/00695, filed Feb. 22, 2001, which designated the United States and was not published in English.

BACKGROUND OF THE INVENTION

Field of the Invention

The invention relates to an individual configuration.

In particular for electronic payment transactions, electronic authentication and the like, there is increasingly the need for secure components, that is to say components that have not been or cannot be manipulated. This is to be understood as meaning, for example, the need to protect pass words, code words or the like which are stored in components. However, the intention is also to prevent procedures that are performed on the components from being manipulated. In attempting to avoid such a manipulation, it is often the case that the component is damaged and is replaced by a new unprotected component or, after manipulation, is repaired for operation. For this reason, it is necessary on the one hand to individualize a component, i.e. ensure that each component is unique, and on the other hand to prevent it being possible for a damaged component to be repaired again. Such damage often contains the elimination of contacts, which is in the case of components metallization levels, in order to get to protected information lying under them in the component.

SUMMARY OF THE INVENTION

It is accordingly an object of the invention to provide an individual configuration which overcomes the above-mentioned disadvantages of the prior art devices of this general type, in which the individuality is retained by simple measures and, in the event of damage, the individuality cannot be repaired.

With the foregoing and other objects in view there is provided, in accordance with the invention, an individual configuration. The configuration contains a construction having a first structure and a second structure aligned with respect to the first structure, and a position sensing device for sensing a relative position between the first structure and the second structure.

The fact that, even when there is extreme precision in the production of microelectronic components, there is always a deviation from intended positioning, and such a deviation is generally random, which makes it possible by determining the relative position of the first structure with respect to the second structure by use of the position sensing device to establish an individuality or uniqueness of component placement. The fact that the first or second structure or else both structures have to be removed for the component to undergo examination, results in that it is subsequently no longer possible to establish the same individuality.

The fact that a position storing device is provided in the individual configuration makes it possible by a comparison between the stored positional information and the actually sensed positional information to establish on the individual configuration whether manipulations to the configuration have taken place. The provision of metal contacts as the first and second structures makes it possible to establish the removal of metallization layers on the component, or else the separation of two components lying one on top of the other.

In accordance with an added feature of the invention, a position storing device is provided for storing information on the relative position between the first structure and the second structure and the position storing device is connected to the position sensing device.

In accordance with an additional feature of the invention, the position sensing device has a comparison device for comparing the information stored in the position storing device with a sensed relative position.

In accordance with another feature of the invention, the first structure and the second structure are respectively formed by electrically conducting contacts touching in a partially overlapping manner.

In accordance with a further feature of the invention, the electrically conducting contacts forming the first structure have a smaller surface area than the electrically conducting contacts forming the second structure. The information on the relative position is determined by a number of the electrically conducting contacts of the first structure touching an electrically conducting contact forming the second structure.

In accordance with a further added feature of the invention, the electrically conducting contacts of the first structure, lie in a row, and are spaced apart from one another by a first distance. The electrically conducting contacts of the second structure, lie in a row, and are spaced apart from one another by a second distance and the first distance and the second distance are different.

In accordance with a further additional feature of the invention, a MOS transistor is provided that has a buried channel and a gate. The first structure forms the buried channel of the MOS transistor, and the second structure forms the gate of the MOS transistor.

In accordance with a concomitant feature of the invention, the information on the relative position is a deviation from a predetermined position.

Other features which are considered as characteristic for the invention are set forth in the appended claims.

Although the invention is illustrated and described herein as embodied in an individual configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
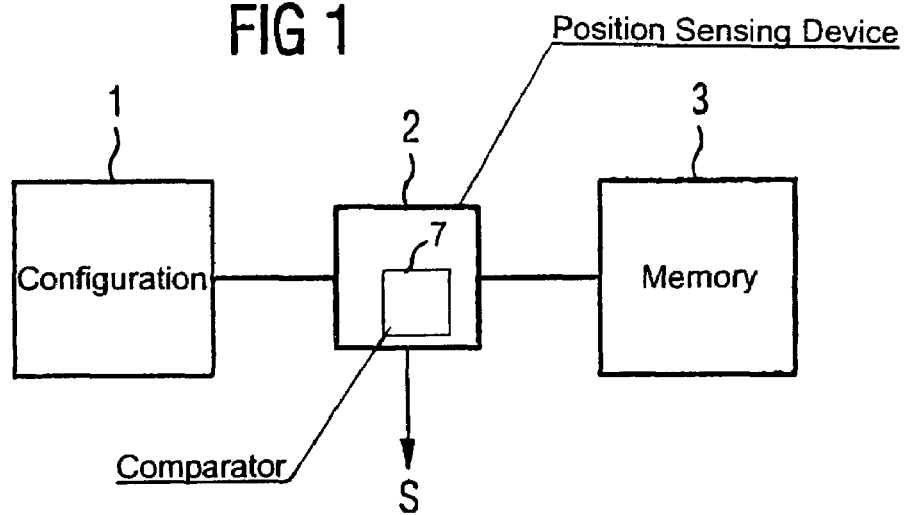
FIG. 1 is a block diagram of a device for determining positional information regarding an individual configuration according to the invention.

Referring now to the figures of the drawing in detail and first, particularly, to FIG. 1 thereof, there is shown a construction 1 in which a first structure 4 and a second structure 5, as they are represented for example in FIG. 2 to FIG. 6, are to be sensed. Positional information, i.e. a relative position between the first structure 4 and the second structure 5, can be sensed by a position sensing device 2. The positional information is stored in a position storing device or memory 3 and the position sensing device 2 can compare the stored positional information with the actually occurring positional information of the construction 1 in a comparison device 7 and the position sensing device 2 emits a corresponding signal S.

Figure 2:
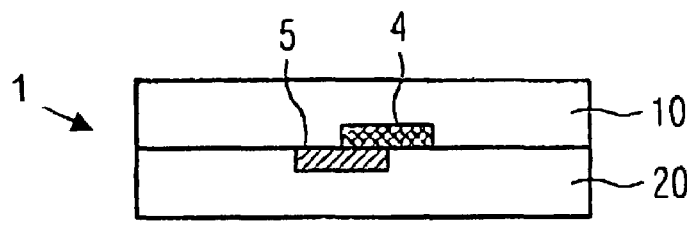
FIG. 2 is a diagrammatic, cross-sectional view of a first structure and a second structure of the individual configuration.
Figure 3:
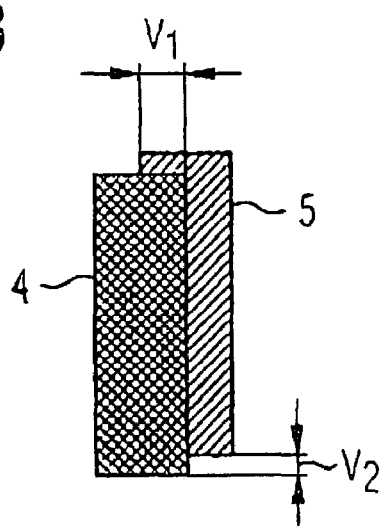
FIG. 3 is a plan view of the configuration shown in FIG. 2.

In FIG. 2, there is provided a first layer 10, in which a metallic contact 4 is provided as the first structure 4. Adjacent to this is a second layer 20, in which a second metallic contact 5 is provided as the second structure 5. The two contacts 4, 5 butt against each other at the boundary layer. The contacts 4, 5 may be two metallization levels of an electronic component or else contact areas of two components resting one on top of the other with their surfaces against each other.

The position sensing device 2 is then capable of establishing by a resistance measurement the degree of overlap and consequently an item of positional information of the configuration. As revealed by FIG. 3, in that the configuration according to FIG. 2, is represented in a plan view, this may contain a displacement in two directions, which is a first displacement $V_1$ and a second displacement $V_2$.

In the case of a configuration of this type, it is admittedly difficult to ascertain the positional information by a resistance measurement. For this, it would be necessary to perform what are known as four-point measurements.

Figure 4:
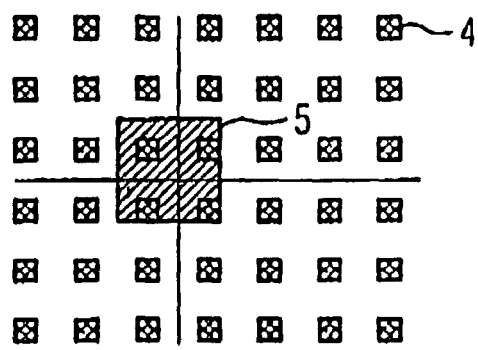
FIG. 4 is a plan view of a second configuration of the first structure and the second structure in the individual configuration.

The acquisition of positional information is made easier with the configuration according to FIG. 4. Here, a multiplicity of first contacts 4 are provided, making contact with the second contact 5 of a larger surface area. By determining which of the first contacts 4 are touching the second contact 5, the positional information can be obtained.

Figure 5:
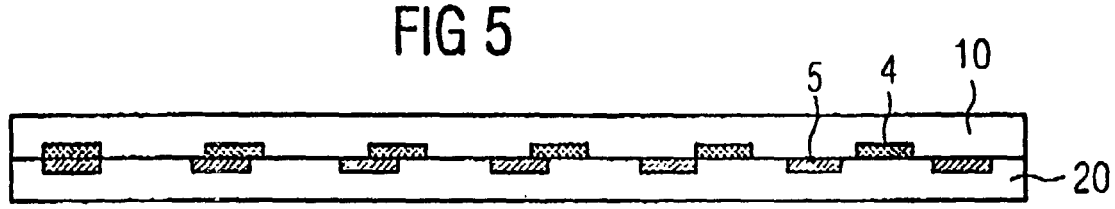
FIG. 5 is a sectional view of a third configuration of the configuration of the first structure and the second structure of the individual configuration.

Similar in principle is the acquisition of the positional information with the configuration according to FIG. 5. Here, the first contacts 4 are made to be of a size similar to that of the second contacts 5. However, a different spacing is provided between the first contacts 4 and the second contacts 5. Consequently, when there is a misalignment of the first layer 10 with respect to the second layer 20, it follows that the misalignment can be established by determining the contacts that are touching, in a way similar to a vernier.

Figure 6:
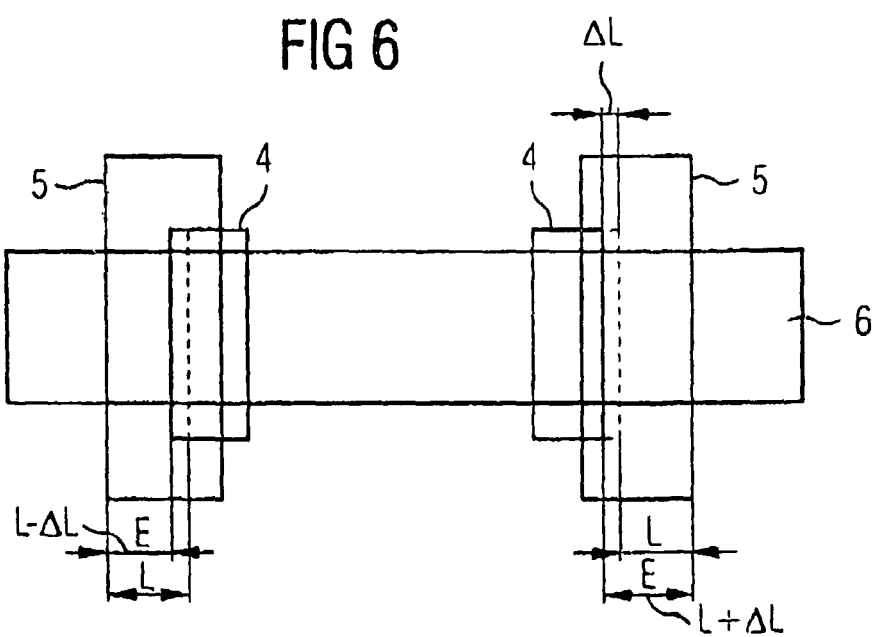
FIG. 6 is an illustration of a second exemplary embodiment of the individual configuration according to the invention.

In FIG. 6, a second exemplary embodiment is represented. In this case, two transistors lying one behind the other of an EEPROM cell 6 are represented by way of example. In a way corresponding to the previous exemplary embodiments, here the second structure 5 is provided, and functions as a gate 5 of a first transistor. For the generally known function of a transistor in an EEPROM cell, what is known as a "buried channel" 4 is provided. For the functioning mode of the transistor it is envisaged that the buried channel 4 is disposed at the position indicated by dashed lines, so that a gate length L is formed. Minimal inaccuracies in production can give rise to an offset $\Delta L$ from its predetermined position to the left or right. This consequently gives an effective gate length E where $E = L + \Delta L$ or $E = L - \Delta L$.

The effective gate length E can be measured and can be monitored for individual transistors.

The operating mode of the individual configurations explained above is explained below. When the configuration is put into operation for the first time, the position sensing device 2 establishes the relative position between the first structure 4 and the second structure 5. In this case, it is immaterial whether a resistance measurement, the sensing of individual contacts or the determination of an effective gate length is involved. The positional information consequently sensed is stored a single time in the position storing devices 3. During the operation of the individual configuration it is checked whether the stored information coincides with the actual configuration. This can take place by the position sensing device 2 ascertaining the relative position between the first structure 4 and the second structure 5 each time the individual configuration is once again put into operation, and comparing it with the positional information stored in the position storing device 3. If the two coincide, it may be provided for example that the signal S indicating that no manipulations have been performed on the configuration is emitted. Alternatively, it may be provided that, if they do not coincide, a signal indicating the manipulation on the configuration is emitted.

Furthermore, it is also conceivable to dispense with the position storing device 3. In such a case, the individual positional information would have to be stored by an external device when the individual configuration is put into operation for the first time and this information would have to be called up as soon as the configuration is operated once again.

It can be easily appreciated that many further configurations that are not represented here but correspond to the idea of the present invention are conceivable. It has been found that the structures described yield accuracies for sensing the position in the µm to sub-µm range, depending on the extent of the structures involved.

It is also possible to combine a number of structures, so that for example a coarse vernier and a fine vernier are provided. When a structure is removed, it is not possible to recreate the exact position.

We claim:
1. An individual configuration, comprising:
   a construction having a first structure and a second structure aligned with respect to said first structure, said first structure being disposed in a first device and said second structure being disposed in a second device;
   a position sensing device for sensing a relative position between said first structure and said second structure; and
   a position storing device connected to said position sensing device, said position storing device storing information on the relative position between said first structure and said second structure when the individual configuration is put into operation for the first time; said position sensing device and said position storing device being disposed within the individual configuration.

2. The individual configuration according to claim 1, wherein said position sensing device has a comparison device for comparing the information stored in said position storing device with a sensed relative position.

3. The individual configuration according to claim 1, wherein said first structure and said second structure are respectively formed by electrically conducting contacts touching in a partially overlapping manner.

4. The individual configuration according to claim 3, wherein said electrically conducting contacts forming said first structure have a smaller surface area than said electrically conducting contacts forming said second structure.

5. The individual configuration according to claim 4, wherein the information on the relative position is determined by a number of said electrically conducting contacts of said first structure touching an electrically conducting contact forming said second structure.

6. The individual configuration according to claim 3, wherein:
    said electrically conducting contacts of said first structure, lie in a row, and are spaced apart from one another by a first distance; and
    said electrically conducting contacts of said second structure, lie in a row, and are spaced apart from one another by a second distance and the first distance and the second distance are different.

7. The individual configuration according to claim 1, further comprising a MOS transistor having a buried channel and a gate, said first structure forming said buried channel of said MOS transistor, and said second structure forming said gate of said MOS transistor.

8. The individual configuration according to claim 7, wherein the information on the relative position is a deviation from a predetermined position.

* * * * *